United States Patent [19]
Penny

[11] 3,963,282
[45] June 15, 1976

[54] CANTILEVERED ROLLER SEPARATOR FOR ROCK BIT BEARINGS

[75] Inventor: Samuel Lee Penny, Lancaster, Tex.
[73] Assignee: Dresser Industries, Inc., Dallas, Tex.
[22] Filed: Feb. 13, 1975
[21] Appl. No.: 549,586

[52] U.S. Cl. ............................... 308/8.2; 308/217
[51] Int. Cl.² ......................................... F16C 19/04
[58] Field of Search ............ 308/8.2, 207, 217, 212, 308/213; 175/371

[56] References Cited
UNITED STATES PATENTS

| | | | |
|---|---|---|---|
| 71,973 | 12/1867 | Burnap | 308/217 |
| 3,601,456 | 8/1971 | Becker | 308/8.2 |

*Primary Examiner*—M. H. Wood, Jr.
*Assistant Examiner*—Gene A. Church
*Attorney, Agent, or Firm*—Eddie E. Scott

[57] ABSTRACT

The roller bearing capacity of a rotary rock bit is increased even though the total number of rollers in the roller bearing system is reduced. Two halves of a split ring bearing cage are positioned around the bearing pin of a rotary rock bit between the bearing pin and the cutter member. The split ring bearing cage includes cantilevered separator elements that extend from the body of the cage on the bearing pin toward the body of the bit. The separator elements are alternatively positioned between cylindrical rollers and act to maintain the rollers in a position to receive the maximum stress imposed on the roller bearing system. The cantilevered separator elements provide a material for the rollers to slide against that is more compatible with the rollers than when the rollers are sliding against each other.

6 Claims, 4 Drawing Figures

CANTILEVERED ROLLER SEPARATOR FOR ROCK BIT BEARINGS

BACKGROUND OF THE INVENTION

The present invention relates to the art of earth boring and more particularly to an improved rotary rock bit. The present invention is especially adapted for use in that type of rotary rock bit popularly known as a three-cone bit; however, its use is not restricted thereto, and the present invention can be used in other types of rotary rock bits.

A three-cone rotary rock bit is adapted to be connected as the lowest member of a rotary drill string. As the drill string is rotated, the bit disintegrates the earth formations to form an earth borehole. The three-cone rotary rock bit includes three individual arms that extend angularly downward from the main body of the bit. The lower end of each arm is shaped to form a spindle or bearing pin. A cone cutter is mounted upon each bearing pin and adapted to rotate thereon. Individual bearing systems promote rotation of the cone cutter. These bearing systems have traditionally been roller bearings, ball bearings, friction bearings, or a combination of the aforementioned bearings. The cone cutters include cutting structure on their outer surfaces that serve to disintegrate the formations as the bit is rotated.

The rotary rock bit must operate under very severe conditions, and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cones, thereby providing a longer useful lifetime for the cones. This has resulted in the bearing systems being the first to fail during the drilling operation. Consequently, a need exists for improved bearing systems to extend the useful lifetime of the bit.

In addition to rotational forces experienced by the bit, the bit is subjected to a thrust load during operation. The weight of the drill string and in some instances the downward force applied by the rotary drilling equipment apply a substantial thrust load to the bit. The thrust load in combination with the rotational forces tend to force the rollers into a postition askew to the longitudinal axis of the bearing pin. Wear of the roller bearing races tends to exaggerate the skewing problem.

The present invention assists in achieving a more uniform load distribution in the bearing during the drilling operation and lowers contact stress due to reduced misalignment between the rollers and the bearing races. The rollers are guided in such a way as to insure that the axes of the rollers remain parallel to the axis of the bearing pin and aligned with the bearing races to prevent skewing of the rollers during the drilling operation. The present invention also prevents the rollers from sliding against each other. The rollers are spaced symmetrically around the periphery of the bearing pin to help achieve a more uniform load distribution. Heat is dissipated from the bearing surfaces and the lubricant to assist in reducing the operating temperature of the bearing. A split bearing cage with cantilevered spearator elements projecting between the rollers provides a more compatible material for the rollers to slide against. The present invention allows the above advantages to be obtained without requiring a substantially greater amount of space than is normally allocated to the roller bearing system. Space is an extremely important limitation in rotary rock bits, and the ability to increase bearing performance without increasing the space required for the bearing is a substantial improvement.

DESCRIPTION OF PRIOR ART

In U.S. Pat. No. 3,102,601 to D. P. Worth, assigned to Phillips Petroleum Company, patented Sept. 3, 1963, an improved drill bit is shown. Specifically, the improvement relates to providing a drill bit having therein means for releasing drilling fluid at and for predetermined intervals from the face of a tooth on the cutter in order to thereby blow the detritus broken loose from the formation away from the cutter. It is preferred to use a compressed gas such as air for the drilling fluid that is released from the face of the tooth, but grit-free liquids may also be used. The radial loads are carried by the outboard bearings 40 and the inboard bearings 42. The inboard radial bearing comprises the roller bearings 42 spaced apart by the retainer 43. In some installations it may be possible to omit the spacers 41 and 43.

In U.S. Pat. No. 3,235,316 to J. R. Whanger, assigned to Hughes Tool Company, patented Feb. 15, 1966, a journal bearing for a rock bit is shown with alternating surface areas of wearresistant and antigalling materials. The bearing system disclosed in this patent includes grooves in one of the rotatable members and a soft metal having anti-galling characteristics positioned in the grooves.

In U.S. Pat. No. 3,720,274 to H. F. McCallum, assigned to Dresser Industries, Inc., patented Mar. 13, 1973, intermediate thrust elements are positioned between the cutters and the bearing pins of an earth boring bit. Each intermediate thrust element is located between a thrust surface on a bearing pin and a thrust surface on the associated cutter. The intermediate thrust elements aid stabilization of the rotating cutter, promote cutter rotation and extend the lifetime of the bit.

In U.S. Pat. No. 3,784,264 to G. C. Jackson, Jr. assigned to Dresser Industries, Inc., patented Jan. 8, 1974, an earth boring bit bearing system is shown. The bearing surface of one relatively rotatable member of a friction bearing is grit blasted to give it a roughened surface. A reservoir containing lubricant having entrained particles of anti-galling material is connected to the friction bearing and serves as a source of anti-galling material. Particles of the anti-galling material are picked up by the roughened surface and a film of anti-galling material formed on the bearing surface.

When reviewing non-analogous prior art, a substantial variety of designs of bearing systems will be noted. For example, in U.S. Pat. No. 71,973 to John A. Burnap, patented Dec. 10, 1867, an improvement in pulley-block including an open ended bearing cage is shown in U.S. Pat. No. 3,582,164 to William Derner, patented June 1, 1971, a powdered metal bearing cage is shown.

SUMMARY OF THE INVENTION

The present invention provides an improved bearing system for a rotary rock bit. The bearing system prevents the bearing rollers from becoming disoriented on the bearing pin. The present invention stabilizes the rolling cutters, increases bearing life, and reduces heat generation. The present invention provides a bearing cage with cantilevered separator elements between bearing rollers. These separator elements provide a material that may be more compatible with the metals used for the rollers. The bit of the present invention includes a bit body, at least one bearing pin extending from said bit body, a cutter member rotatably positioned on said bearing pin, a plurality of cylindrical rollers positioned between said bearing pin and said cutter member, and a bearing cage with a plurality of cantilevered separator elements positioned between said bearing pin and said cutter member. Each of the individual separator elements are positioned between a pair of adjacent rollers. The bearing system of the present invention does not require an appreciably larger amount of the valuable space in the bit than roller bearing systems of the prior art. The above and other features and advantages of the present invention will become apparent from a consideration of the following detailed description of the invention when taken in conjunction with the drawings.

DETAILED DESCRIPTION OF THE INVENTION

Figure 1:
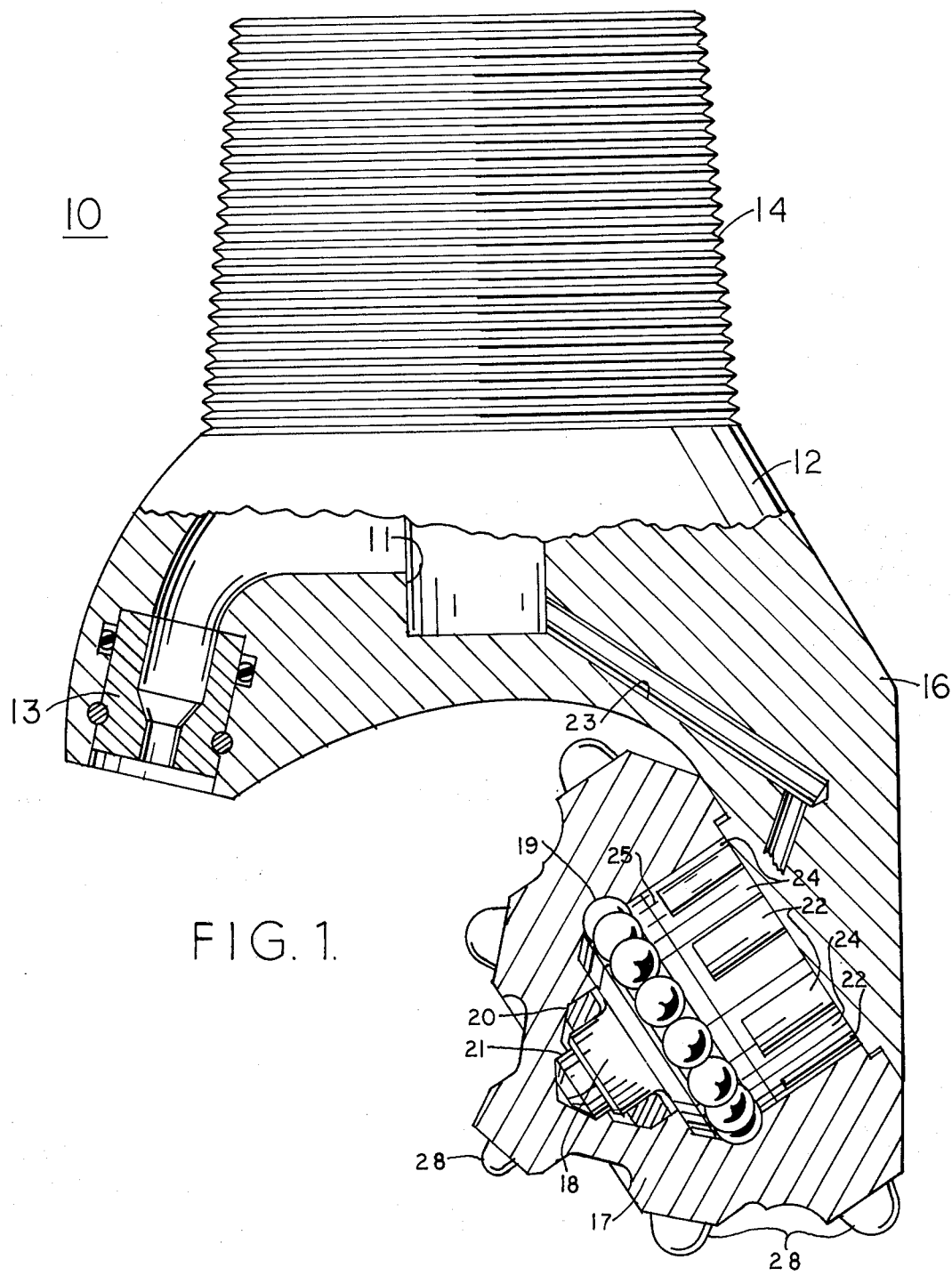
FIG. 1 illustrates an earth boring bit constructed in accordance with the present invention.

Referring now to the drawings and in particular to FIG. 1, an earth boring bit, generally designated by the reference number 10, is illustrated. The bit 10 includes a body portion 12 having an upper portion 14 that is threaded to allow bit 10 to be connected to a rotary drill string (not shown). A multiplicity of arms, arm 16 being shown in section in FIG. 1, extend from body portion 12. The lower portion of each arm forms a bearing pin that projects into a recess formed in the associated rotary cutter. For example, bearing pin 18 extends into a recess in associated rotary cutter 17. The cutter 17 is journaled on bearing pin 18 by a system of roller bearings 22, a system of ball bearings 19, a journal bearing system 20, and a thrust button 21. A passage system 23 provides conduits from the internal chamber 11 to transport cooling fluids to the bearings.

Rotary and thrust loads are applied to the bit 10 during the drilling operation. These loads apply a force to the system of roller bearings 22 that tends to disorient the rollers 22 with respect to the longitudinal axis of bearing pin 18. As the bearing races become increasingly worn, the tendency of the rollers 22 to skew relative to the bearing pin 18 becomes greater.

Referring again to FIG. 1, the system of roller bearings of the bit 10 will be described in greater detail. A split bearing cage 25 with cantilevered separator elements 24 between each of the rollers 22 is positioned between the bearing pin 18 and the cutter 17. The spearator elements 24 include concave surface portions that mate with the external surface of the rollers 22. The spearator elements 24 accurately space the rollers 22 around the bearing pin 18 and hold their axes parallel to the axis of the bearing pin 18. The body of the split bearing cage 25 is positioned toward the outer end of the bearing pin 18 with the cantilevered separator elements 24 extending toward the arm 16. This insures that the rollers 22 will be positioned near the base of the cone cutter 17. Since the gage row of inserts is located near the base of the cone cutter 17 and the gage row of inserts handles the most severe cutting condition, the rollers 22 are positioned to handle the maximum stress.

The rollers 22 are hardened steel rollers of high wear resistance. In prior art rotary rock bits, the rollers were in contact with each other and in contact with other elements of hardened steel having high wear resistance. The sliding contact between the hardened steel rollers created an undesirable condition that on occasion would result in the eventual destruction of the rollers and ultimate failure of the bit. Since the surfaces of the adjacent rollers that are in sliding contact are moving in opposite directions and at a substantial relative speed, the sliding friction developed is substantial.

The separator elements 24 of the present invention provide an element for the rollers to slide against that does no increase the relative sliding motion. In addition, the separator elements 24 provide a material for the rollers 22 to contact that may be more compatible with the rollers than in prior art bits. For example, the spearator elements 24 are of a different metal than rollers 22. The separator elements 24 do not extend beyond the end of the rollers 22 and the body of the split bearing cage 25 is thin; therefore, the roller bearing system as a unit does not require substantially more space than is normally assigned to the roller bearing system. This is extremely important in a rotary rock bit because of the limited space available for the bearing systems.

Figure 2:
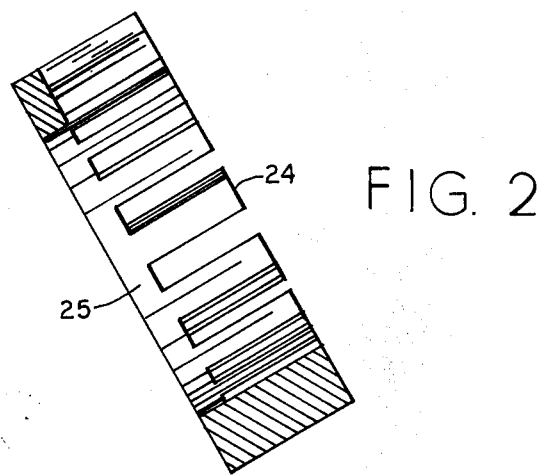
FIG. 2 shows a portion of the roller bearing system of the bit illustrated in FIG. 1.

Referring now to FIG. 2, the split bearing cage 25 is shown in greater detail. The split bearing cage 25 includes a plurality of separator elements 24 extending in cantilever fashion from the annular body of the split bearing cage 25. The separator elements 24 are positioned between the rollers 22. The separator elements 24 include concave surface portions that mate with the external surfaces of the rollers 22. The separator elements 24 and the annular body of the split bearing cage 25 maintain the spacing of the rollers 22 around the bearing pin 18.

Figure 3:
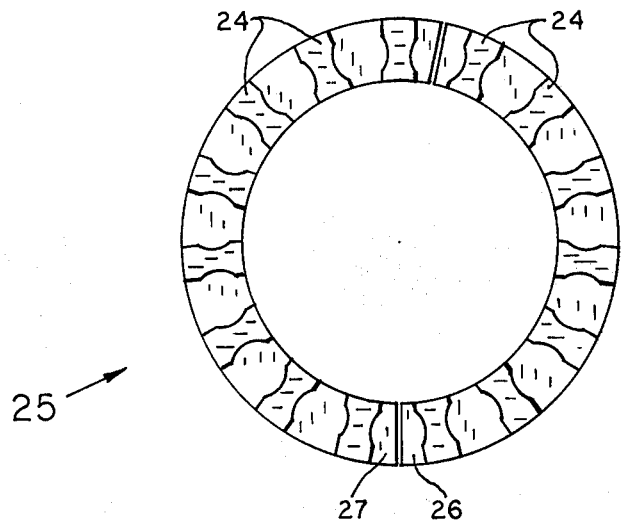
FIG. 3 is another view of the portion of the roller bearing system shown in FIGS. 1 and 2.

Referring now to FIG. 3, a side view of the split bearing cage 25 is shown. The split bearing cage 25 comprises a first section 26 and a second section 27 that together form the annular split bearing cage 25. A plurality of separator elements 24 extend in cantilever fashion from the section 26 and a plurality of separator elements 24 extend in cantilever fashion from the section 27. The sections may be positioned around the bearing pin 18 under conditions wherein a solid annular ring could not slip over the bearing pin 18.

The structural details of a rotary rock bit constructed in accordance with the present invention having been described, the operation of the bit 10 will now be considered with reference to FIGS. 1, 2, and 3. The bit 10 is connected as the lowest element of a rotary drill string by engaging the bit 10 with the drill string by threaded connection 14. The bit 10 is rotated and thrust downward, thrusting the cutters against the earth formations. Continued rotation with the weight of the drill string applying a thrust force to the bit 10 causes the cutters to disintegrate the formations and form the desired borehole. The combination of rotary and thrust forces acts to tend to cause the rollers 22 to attempt to become askew to the central axis of the bearing pin 18 and the bearing races. The split bearing cage 25 serves to prevent the rollers 22 from becoming skewed and provides a material that may be more compatible with the material of the rollers than when the rollers are in direct contact with each other. The rollers 22 and split bearing cage 25 do not require substantially more space than is required by prior art roller bearing systems. The split bearing cage 25 may be assembled on the bearing pin 18 by positioning the separate sections 26 and 27 around the bearing pin 18. The body of the split bearing cage 25 is located between the end of the rollers 22 and the end of bearing pin 18. The cantilevered separator elements 24 extend toward the base of cutter 17. This insures that rollers 22 will be positioned to take the maximum stress applied to the cutter 17.

Figure 4:
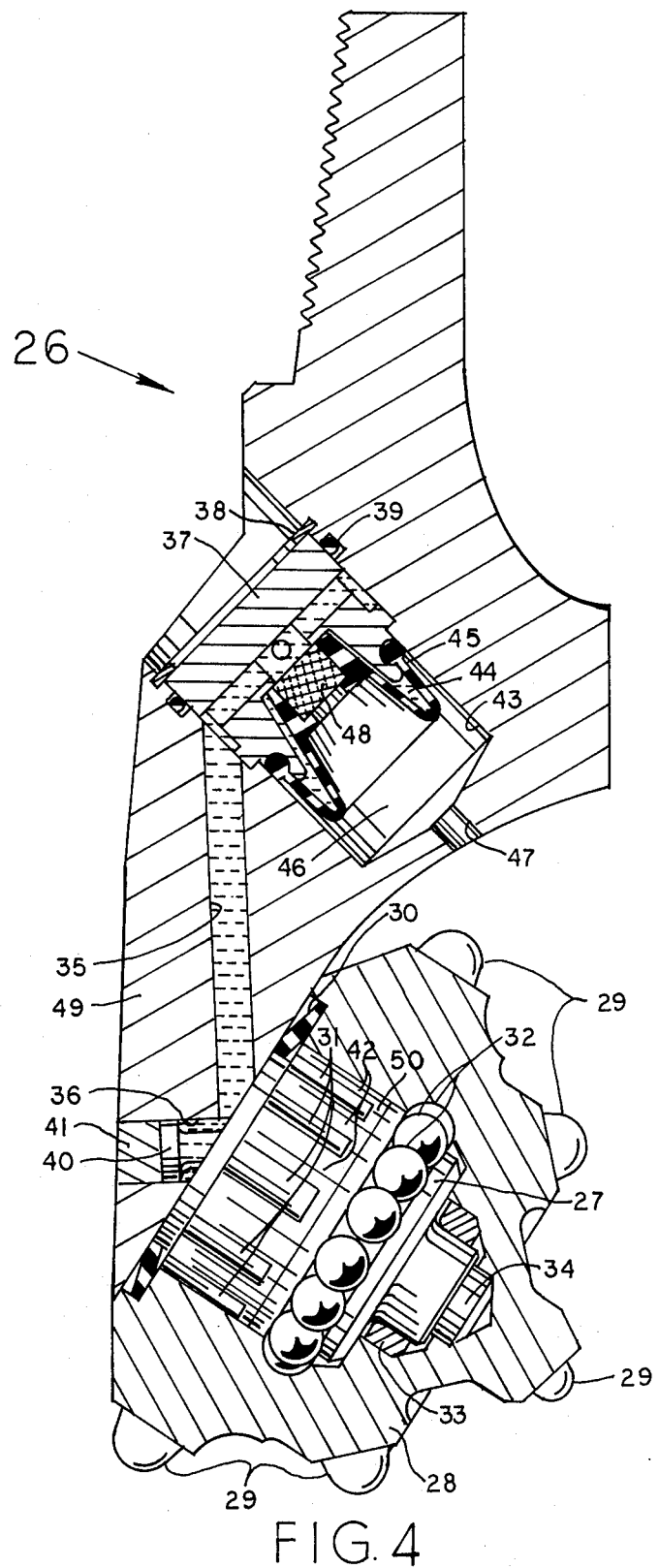
FIG. 4 illustrates another embodiment of the present invention.

Referring now to FIG. 4, a sectional view of one arm 49 of a sealed bearing rotary rock bit 26 illustrating another embodiment of the present invention is shown. As illustrated, the arm 49 depends from the upper portion of the bit 26. The bit 26 includes an upper threaded portion that allows the bit to be connected to the lower end of a rotary drill string (not shown). The lower end of arm 49 is provided with an extended journal portion 27. A rotary cone cutter 28 is rotatably positioned upon the extended journal portion or bearing pin 27. The cutter 28 includes cutting structure 29 on its outer surface adapted to disintegrate formations as the bit 26 is rotated and moved downward. The cutting structure 29 is shown in the form of tungsten carbide inserts. However, it is to be understood that other cutting structures such as steel teeth may be used as the cutting structure on the cone cutter 28.

The bit 26 includes a central passage way extending along the central axis of the bit 26 to allow drilling fluid to enter from the upper section of the drill string (not shown) immediately above and passed downward to the bottom of the well bore to flush cuttings and drilling debris from the well bore. A plurality of bearing systems are located in bearing area between the cutter 28 and the bearing pin 27. The bearing systems in the bearing area include a series of roller bearings 31, a series of ball bearings 32, a friction bearing 33, and a thrust button 34. A seal 30 is positioned between the cutter 28 and the bearing pin 27. The seal 30 retains lubricant in the bearing area around the bearings systems and prevents any material in the well bore from entering the bearings.

A bearing cage 50 with cantilevered separator elements 42 is positioned around the bearing pin 27. The separator elements 42 are positioned between each of the rollers 31. The separator elements 42 include concave surface portions that mate with the external surface of the rollers 31. The separator elements 42 are self-aligning and tend to guide the rollers 31 and hold their axes parallel to the axis of the bearing pin 27. The annular body of the bearing cage 50 is positioned toward the outer end of the bearing pin 27 with the cantilevered separator elements 42 extending toward the arm 49. This insures that the rollers 31 will be positioned near the base of the cone cutter 28. Since the gage row of inserts is located near the base of the cone cutter 28 and the gage row of inserts handles the most severe cutting condition, the rollers 31 are positioned to handle the maximum stress.

The rollers 31 are hardened steel rollers of high wear resistance. In prior art rotary rock bits, the rollers were in contact with each other and in contact with other elements of hardened steel having high wear resistance. The sliding contact between the hardened steel rollers create an undersirable condition that on occasions, would result in the eventual destruction of the rollers and ultimate failure of the bit. Since the surfaces of the adjacent hardened steel rollers that are in sliding contact are moving in opposite directions and at a substantial relative speed, the sliding friction developed is substantial.

The separator elements 42 of the present invention provide an element for the rollers to slide against that does not add to the sliding motion. In addition, the separator elements 42 provide a material for the rollers 31 to contact that may be more compatible with the hardened steel rollers than in prior art bits. For example, the separator elements 42 are of a different metal than the hardened steel rollers 31. The separator elements 42 do not extend beyond the end of the rollers 31 and the roller bearing system as a unit does not require substantially more space than is normally assigned to the roller bearing system. This is extremely important in a rotary rock bit because of the limited space available for the bearing systems.

The lubrication system of the bit 26 includes a passage 35 that extends through the bearing pin 27 to the bearing area to allow lubricant be transmitted to the bearings systems. A passage 36 connected to the passage 35 allows the make up of the ball bearing system 32 by allowing the balls to be inserted into position after the cone cutter 28 is placed on the bearing pin 27. The series of ball bearings 32 serve to lock the cone cutter 28 on bearing pin 27. After the balls are in place, a plug 42 is inserted into the passage 36 and welded therein by a weld 41. The plug 42 has a reduced diameter throughout the major portion of its length to allow lubricant to be transmitted to the bearing area. Additional passages extend from passage 36 to the bearing area to insure a sufficient supply of lubricant to bearings 31, 32, 33, and 34.

A lubricant reservoir is located in the arm 26 to provide a supply of lubricant to the bearings. A flexible diaphragm 45 is positioned in the lubricant reservoir and encloses the reservoir to retain a supply of lubricant in the lubricant area 44. The area 46 within the reservoir bore but outside of the diaphragm 45 is vented to te dome of the bit by a passageway 47 that connects the lower end of the lubricant reservoir with the dome of the bit. The upper end of lubricant reservoir is closed by a cap 37 and locked in place in the arm 49 by a snap ring 38. An O-ring seal 39 is positioned around the cap 37 to retain lubricant in the lubricant reservoir. A free-breathing porous filter plug 48 extends through the flexible diaphragm 45. The free-breathing porous filter plug 48 provides fluid communication between lubricant in the lubricant area 44 of the reservoir and fluid from the bore hole that has entered pressure equalizing portion 46 of the lubricant reservoir. The plug 48 is in the form of compressed metal particles positioned within an open metal cylinder.

The structural details of a rotary rock bit 26 constructed in accordance with the present invention having been described, the operation of the bit 26 will now be considered with reference to FIG. 4. The bit 26 is connected as the lowest element of a rotary drill string by engaging the bit 26 with the drill string by the threaded connection. The bit 26 is rotated and thrust downward, thrusting the cutters against the earth formations. Continued rotation with the weight of the drill string applying a thrust force to the bit 26, causes the cutters to disintegrate the formations and form the desired borehole. The combination of rotary and thrust forces acts to tend to cause the rollers 31 to attempt to become askew to the central axis of the bearing pin 27 and the bearing races. The separator elements 42 serve to prevent the rollers 31 from becoming skewed and provides a material that may be more compatible with the material of the rollers than when the rollers are in direct contact with each other. The rollers 31 and separator elements 42 do not require substantially more space than is required by prior art roller bearing system.

The lubrication system of the bit 26 is filled with a suitable lubricant and the area 44 above the flexible diaphragm 45 is completely filled with lubricant. The flexible diaphragm 45 seals the lower end of the lubricant reservoir and is held in place by the lower portion of the cap 37. The bit 26 is lowered into a well bore until the cutter 28 contacts the earth formation at the bottom of the borehole. The hydrostatic pressure of fluid in the well bore is substantial and a pressure differential between the pressure of the lubricant inside of the bit 26 and the pressure fluid in the borehole will ordinarily develop. The lubrication system of the bit 26 allows the pressure of fluid in the well bore to be transmitted to the lubricant in the lubricant reservoir and the pressures are equalized as the bit 26 is moved through the borehole. Lubricant from the lubricant reservoir passes through passages 35 and 36 and is transmitted to the bearing systems including roller bearing 31 and separator elements 42 to extend the useful lifetime of the bit.

The embodiments of the invention in which an exclusive property or privelege is claimed are defined as follows:

1. A rotary rock bit, comprising:
   a rock bit body;
   at least one bearing pin extending from said rock bit body, said bearing pin having a longitudinal axis;
   a cutter member rotatably positioned on said bearing pin;
   a plurality of cylindrical rollers positioned around said bearing pin between said bearing pin and said cutter member, said cylindrical rollers having a longitudinal axis with the longitudinal axis of the cylindrical rollers being substantially parallel to the longitudinal axis of said bearing pin; and,
   a split bearing cage positioned on said bearing pin, said split bearing cage comprising a plurality of separator elements cantilevered from a first section of an annular spacer element body and from a second section of an annular spacer element body, said separator elements alternately positioned between said cylindrical rollers.

2. A rotary rock bit, comprising:
   a rock bit body;
   at least one bearing pin extending from said rock bit body, said bearing pin having a longitudinal axis;
   a cutter member rotatably positioned on said bearing pin;
   a plurality of cylindrical rollers positioned around said bearing pin between said bearing pin and said cutter member, said cylindrical rollers having a longitudinal axis with the longitudinal axis of the cylindrical rollers being substantially parallel to the longitudinal axis of said bearing pin; and,
   a split bearing cage positioned on said bearing pin, said split bearing cage comprising a plurality of separator elements extending in cantilever fashion from separate sections of an annular ring, said separator elements alternately positioned between said cylindrical rollers.

3. A rotary rock bit which encounters drilling forces in operation, comprising:
   a rock bit body;
   at least one bearing pin extending from said rock bit body, said bearing pin having a longitudinal axis and an outer end positioned away from said rock bit body;
   a cutter member of generally conical configuration rotatably positioned on said bearing pin, said cutter member having a base that is exposed to the most rigorous drilling forces;
   a plurality of cylindrical rollers positioned around said bearing pin between said bearing pin and said cutter member, said cylindrical rollers having a longitudinal axis with the longitudinal axis of the cylindrical rollers being substantially parallel to the longitudinal axis of said bearing pin; and,
   a spacer unit positioned on said bearing pin, said spacer unit comprising a separator element body portion positioned around said bearing pin, said separator element body portion located between said cylindrical rollers and said outer end of said bearing pin, said spacer unit also including a plurality of separator elements cantilevered from said separator element body portion extending away from said outer end of said bearing pin toward said base of said cutter, said separator elements extending proximate said base with said separator elements alternately positioned between said cylindrical rollers thereby maintaining said cylindrical rollers in position to support the most rigorous drilling forces.

4. A rotary rock bit, which encounters gage loads when drilling, comprising:
   a rock bit body;
   at least one bearing pin extending from said rock bit body, said bearing pin having a longitudinal axis and an outer end spaced away from said rock bit body;
   a cutter member rotatably positioned on said bearing pin, said cutter member having a base positioned proximate said rock bit body wherein said base encounters said gage loads;
   a plurality of cylindrical rollers positioned around said bearing pin between said bearing pin and said cutter member, said cylindrical rollers having a longitudinal axis with the longitudinal axis of the cylindrical rollers being substantially parallel to the longitudinal axis of said bearing pin; and,
   a spacer positioned on said bearing pin, said spacer comprising a plurality of separator elements extending in cantilever fashion from an annular ring and alternately positioned between said cylindrical rollers with the annular ring being positioned between said cylindrical rollers and said outer end of said bearing pin and the separator elements extending to said base of said cutter member thereby maintaining said cylindrical rollers in position to receive said gage loads.

5. A rotary rock bit, comprising:
   a rock bit body;

at least one bearing pin extending from said rock bit body, said bearing pin having a longitudinal axis and an outer end spaced from said rock bit body;

a cutter member rotatably positioned on said bearing pin;

a plurality of cylindrical rollers positioned around said bearing pin between said pin and said cutter member, said cylindrical rollers having a longitudinal axis with the longitudinal axis of the cylindrical rollers being substantially parallel to the longitudinal axis of said bearing pin; and, a split bearing cage positioned on said bearing pin, said split bearing cage comprising a plurality of separator elements cantilevered from a first section of an annular spacer element body and from a second section of an annular spacer element body, said first section of an annular spacer element body and said second section of an annular spacer element body being located between said cylindrical rollers and said outer end of said bearing pin with said separator elements alternately positioned between said cylindrical rollers.

6. A rotary rock bit, comprising:

a rock bit body;

at least one bearing pin extending from said rock bit body, said bearing pin having a longitudinal axis and an outer end spaced from said rock bit body;

a cutter member rotatably positioned on said bearing pin;

a plurality of cylindrical rollers positioned around said bearing pin between said bearing pin and said cutter member, said cylindrical rollers having a longitudinal axis with the longitudinal axis of the cylindrical rollers being substantially parallel to the longitudinal axis of said bearing pin; and, a split bearing cage positioned on said bearing pin, said split bearing cage comprising a plurality of separator elements extending in cantilever fashion from separate sections of an annular ring with said separate sections of an annular ring located between said cylindrical rollers and said outer end of said bearing pin and said separator elements alternately positioned between said cylindrical rollers.

* * * * *

UNITED STATES PATENT OFFICE
CERTIFICATE OF CORRECTION

Patent No. 3,963,282          Dated June 15, 1976

Inventor(s) Samuel Lee Penny

It is certified that error appears in the above-identified patent and that said Letters Patent are hereby corrected as shown below:

Column 9, line 7, after "said", second occurrence, insert -- bearing --.

Column 10, line 18, after "ring" insert -- being --.

Signed and Sealed this

Thirty-first Day of August 1976

[SEAL]

Attest:

RUTH C. MASON
*Attesting Officer*

C. MARSHALL DANN
*Commissioner of Patents and Trademarks*